United States Patent Office 3,169,302
Patented Feb. 16, 1965

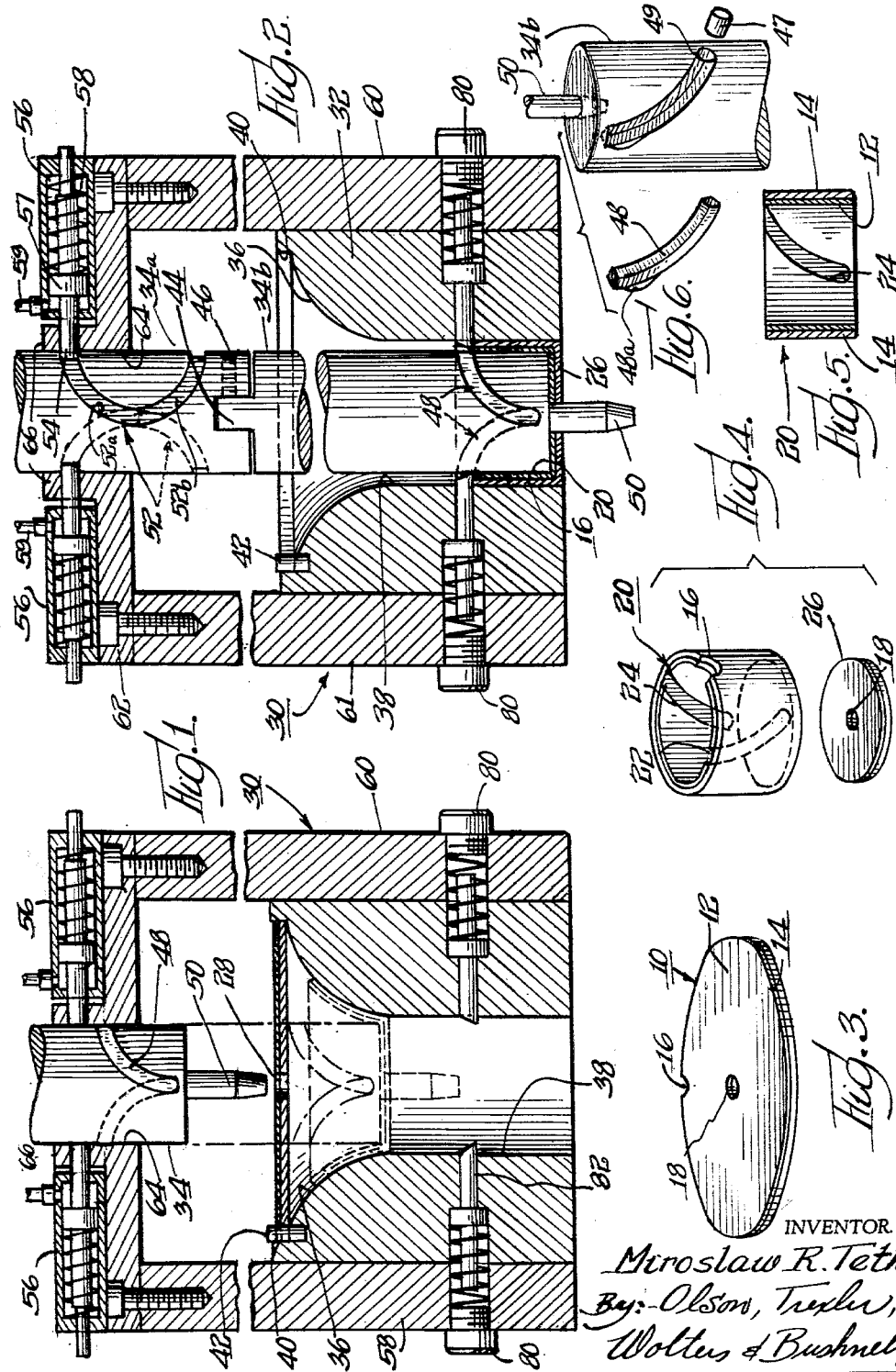

3,169,302
METHOD AND APPARATUS FOR FORMING
SLEEVE BEARINGS
Miroslaw R. Tethal, 331 N. 2nd St., Elsie, Mich.
Filed June 20, 1963, Ser. No. 289,236
7 Claims. (Cl. 29—149.5)

The present invention relates to apparatus and method for forming sleeve bearings or bushings having internal oil-groove structure, and particularly relates to method and apparatus adapted to form a helical or spiral-shaped oil-groove along an internal bearing surface of a continuous sleeve bushing.

With respect to mounting rotatable shafts and journal members, a separate insert or bushing is frequently provided to form the bearing surface for supporting the shaft in a sleeve bearing. The bushing may be made of a material that is known to have desirable qualities of high load capacity and low friction when a suitable film of lubricant is interposed between the journal and bearing surface.

Although the prior art has known a considerable variety of sleeve bearing structures, certain of which have been cast, others machined from bar stock or formed from tubing or sheets, the bushing or bearing structure involved with the present invention is a continuous sleeve bushing fabricated by the apparatus of the instant invention from a flat disk in a deep drawn, punch press type operation or method. The side of the disk-like workpiece destined to constitute a bearing surface may comprise a thin layer of bronze, aluminum, or Babbitt metal applied to a steel backing in a manner well known in the art. The steel backing, which will be formed into a ring-like jacket, affords strength to the bushing unit which is usually held in place by a light press fit.

It has been common practice in the art to provide on the bearing surface of a sleeve bearing an axially extending oil-groove to insure a copious oil supply for dispersion along the rotatable journal member. An oil hole is provided at some point along the extent of the oil-groove to connect with associated oil supply means. Either or both ends of the longitudinal oil-groove may be closed short of the axial extent of the bearing so as to provide a captive oil supply thereby to maintain oil pressure and film thickness along the bearing surface.

In an application requiring a sleeve bearing of short axial length in relation to the bearing diameter, an axial oil-groove may not be entirely satisfactory in that of necessity the length of such oil-groove is limited and thus the supply of oil which can be delivered through such groove to the bearing surface is correspondingly restricted. One manner of overcoming the shortcoming is to provide a helical or spiral oil-groove structure along the bearing surface so as to afford an oil-groove of considerable length in relation to axial length of the bearing. The provision of a helical oil-groove structure is also advantageous in that the oil-groove subtends a substantial arc along the bearing surface and thus tends to supply an oil film more uniformly over the bearing area than would be the case if a shorter axially extending oil-groove were employed.

It is to be understood that for the best operation of a sleeve bearing a helical oil-groove structure thereon should be closed at least at one end so as to maintain oil pressure and film thickness across the axial expanse of the bearing. Where only one end of the helical groove is closed, oil may be supplied to the oil-groove through the open end of the groove structure. Being that a closed end helically shaped oil-groove is desirable particularly in a short sleeve bearing, the known apparatus and methods for fabricating such an oil-groove structure have not been altogether satisfactory in that where internal milling or broaching of a circular tube is utilized the cost of tooling and machine set-up time, as well as the operation cost of loading the workpiece into the machine may be disproportionate in view of the obtainable market price for the resulting sleeve bearing structure.

In view of the above it is a broad object of this invention to provide a new and improved apparatus and method for fabricating from metal disks, sleeve bearings having on an internal bearing surface helical oil-groove structures.

Another object of the invention is to provide apparatus for forming sleeve bearings from metal disks rapidly and economically in a deep drawing type of operation.

Still another object is to form in a coining or deep drawing method a continuous sleeve bearing structure having a spiral or helical oil-groove along an internal surface thereof.

A further object of the invention is to provide improved and novel apparatus which will function efficiently over a long life in a conventional punch press to produce at a rapid rate ring-like bushings having internally disposed, helically-shaped oil-groove structures.

Further features of the invention pertain to the particular arrangement of the elements of the bushing fabricating apparatus and the method whereby the above-outlined and additional operating features are attained.

The invention, both as to its organization and method of operation, together with further objects and advantages thereof, will best be understood by reference to the following specification, taken in connection with the accompanying drawing in which like reference numerals refer to like parts througtout, in which:

FIGURE 1 is a vertical sectional view through a bushing forming apparatus embodying the principles of the present invention; and illustrating in solid lines a draw punch or mandril in an initial position of the forming scheme wherein a workpiece, shown in section, can be loaded into the apparatus; and further depicting in phantom lines the mandril and workpiece in an intermediate position of the forming portion;

FIG. 2 is a view similar to FIG. 1 but showing the workpiece formed on the mandril into a cup-like structure, mandril control means and workpiece holding means being shown in position for separation of the mandril from the workpiece;

FIG. 3 is a perspective view of a metal workpiece suitable for fabricating a bushing with the method and apparatus of the present invention;

FIG. 4 is an exploded view of a bushing frabricated by the apparatus and method of the present invention, a disk-like bottom portion being shown removed from the circular side wall structure of the bushing;

FIG. 5 is an axial sectional view through the bushing of FIG. 4; and

FIG. 6 is a fragmentary, exploded perspective view of the working portion of the draw-punch or mandril.

Referring first to FIGURES 3-5 of the drawing, there is shown a blank circular workpiece 10 prior to its submission to the instant invention and a finished bushing structure 20 formed by the apparatus of the invention. The disk-like workpiece 10, shown in FIG. 3, is a bimetallic element the upper portion of which may be bronze, aluminum or other common bearing materials applied to a steel backing 14, through well understood processes of powdered metallurgy.

Strength for a bearing to be formed from the disk 10, of course, will be provided largely through the instrumentality of the steel backing 14 while anti-friction and lubricant spreading properties are afforded by the layer 12. Along the edge of the disk 10 a recess 16 is provided and in the center an aperture 18 is arranged, both elements being for locating purposes which will become more apparent below.

In FIGS. 4 and 5 there is shown a bushing 20 which has been formed from the disk 10 of FIG. 3. Diametrically oppositely arranged helical oil-groove structures 22 and 24 are disposed on the interior surface of the bushing 20, which interior surface is composed of the bearing material indicated in 12 at FIG. 3. It is to be recognized that the sleeve bushing formed by the apparatus of the present invention first takes the shape of a cup having cylindrical side walls and a bottom wall portion 26. A bottom wall portion 26 may be removed from the side wall or bushing either simultaneously by blanking along with the forming of the sleeve bearing 20 or through a later operation such as by sawing or by turning in a screw machine.

Referring now to FIGS. 1 and 2, there is shown apparatus made in accordance and embodying the principles of the present invention, such apparatus being designated generally by the numeral 30. The forming apparatus or tooling 30 includes a female die-block 32 and a cooperating draw punch or mandril 34. The die-block 32 is provided with a throat-like opening 36 which tapers into a central bore 38. Along the upper surface of the block 32 the bore 38 and throat 36 is surrounded by a counterbore 40 having a diameter substantially complementary to the outside diameter of the disk 10. The purpose of the counterbore 40 in the block 32 is to furnish a positioning means for the disk 10 with respect to the bore 38, the counterbore 40, throat 36 and bore 38 being mutually coaxial.

A pin 42 is mounted on the block 32 in the counterbore 40, the recess 16 of the disk 10 being adapted to engage the pin 42 to locate in a predetermined manner the disk 10 with respect to the die-block 32.

As shown in FIG. 2, the draw punch or mandril 34 is of two-part construction having an upper or control member 34a and a lower or forming member 34b. The members 34a, 34b, may be fitted together in a selected predetermined relationship by a mortise and tenon joint, i.e., by providing the member 34b with an upwardly directed extension or tenon 44 to be received in a complementary slot or mortise in the member 34a and secured therein by a set screw 46. The advantage of providing a mandril 34 with two-part construction is that the lower part, 34b, a working portion, is subject to wearing and breaking and tends to require replacement, while the upper or control portion 34a tends to have a longer useful life.

It will be seen from FIGS. 1 and 2 that the free or working end of the mandril portion 34b possesses two outwardly directed helical forming portions arranged on diametrically opposite sides thereof 48. The helically forming portions 48 have a shape complementary to that of the oil-grooves 22 and 24 of the bushing structure 20 as shown in FIGS. 4 and 5. Referring now specifically to FIG. 6, preferably, the helical protrusions 48 are made up from tool steel and keyed, such as by an extension 48a on one end thereof and by a pin 47 abutting the opposite end, into a complementary slot 49 in the member 34b. Alternatively, the helical protrusions and the mandril may be formed integrally by grinding or otherwise machining a one-piece unit from a solid piece of tool material. The protrusions may extend around the periphery of the working member 34b in a helical angle from 1° to about 120° depending upon the desired oil-groove structure. The helical protrusions 48 have a portion adapted to extend above the surface of the member 34b, such section having a cross-section complementary to the desired oil-groove.

A centering pin 50 protrudes outwardly from the forming portion of the mandril 34b, such forming portion being considered that portion of the mandril 34b, near and about the elements 48, which is cylindrical and sized to the inner diameter of the bushing 20. The function of the centering element 50 is to project through the aperture 18 of the disk 10 during the forming operation.

The upper portion 34a of the mandril 34 performs a control function in that it is provided on two diametrically spaced areas each with a helical camway structure 52 adapted to cause screw-like retraction action of the mandril and to then reposition the mandril rotatably in the original position for the succeeding forming stroke. The camway structure 52 may be integral with the member 34a or may be disposed on another element such as a bushing adapted to be fixedly secured to the mandril element 34a. As shown in this embodiment each camway 52 is cut into the wall of the control member 34a. Alternatively, and within the purview of the invention, the cam structure could be raised from the surface of the member 34a or affix thereto to function in a like manner and accomplish the result of the cam means shown.

Axially of the mandril 34, each camway 52 may be divided as to function into two sections, 52a and 52b. The upper section 52a is adapted to provide on the initial portion of the withdrawal stroke of the mandril 34 rotation towards the right as viewed in FIG. 2. The lower section 52b is adapted to provide return rotation to the left as the mandril is further withdrawn.

Cooperating with the camway structure 52 is a pair of cam followers 54 each of which are actuated by an air cylinder 56 or other control element whereby the cam followers 54 will selectively engage the camways 52 to impart the described direction of motion to the mandril 34. More particularly, each cam follower 54 is united to a piston 57 of the air cylinder 56, the piston being biased by a spring 58 towards the mandril 34 thereby to urge the follower 54 into the camway 52. An airline inlet 59 is arranged in the cylinder 56 on the side of the piston 57 opposite from the spring air under pressure being admitted through the inlet 59 causes the retraction of the cam follower from the camway 52 when the end of portion 52a is reached. A sequencing mechanism (not shown) may be employed to selectively switch air flow to the inlet 59 so as to cause the follower to engage and disengage the camway at the proper phase of operation of the apparatus.

The mandril 34 is adapted to be secured by means (not shown) to the ram of a punch press (not shown) or the like whereby to reciprocate the mandril 34 with respect to the die-block 32. The mounting of the mandril 34 to the motion imparting punch press must be such that a degree of rotatability is afforded to the mandril 34, such rotatability being essential during the retraction of the mandril 34 from the die 32 so as not to destroy the helical oil-groove structure 24 in the bushing 20.

Alternatively, the helical protrusions 48 and complementary grooves 24 may themselves coact to impact a twisting motion to the mandril 34 during withdrawal of the mandril from the bore 38 for separation of the bushing 20 and mandril. This function is facilitated when the helix angle is small. Here the need for a separate control element is eliminated.

To maintain the mandril 34 in coaxial alignment with the bore 38, the mounting structure is associated with the die-block 32, the mounting structure including side members 60 and 61 and a horizontally disposed cross-member 62 secured, as by bolts, to the side members 60 and 61. The cross-member 62 may also support the air cylinders 56. A central aperture 64 is provided in the cross-member 62 for receiving the mandril 34 therethrough. A collar-like element or guide 66 surrounds the aperture 64, the element 66 receiving in a radial direction the cam followers 54 therethrough.

In operation the bushing forming apparatus 30 performs certain basic functions common to punch press tooling. In the present case the workpiece 10 is arranged in the counterbore 40 so that the recess 16 of the workpiece will engage the locating pin 42. In this posture the aperture 18 is coaxial with the bore 38 and with the centering element 50. Upon the thrusting downstroke of the mandril 34, shown stepwise in FIG. 1, the element 50 enters the aperture 18 and carries the disk element downwardly through the throat 36 thereby to commence the forming operation as shown by the phantom lines of FIG. 1. It is recognized that the downstroke of the mandril 34 is quite rapid and considerable energy is transferred from the mandril to the workpiece thereby to effect flowing of the metal to form or coin from the workpiece 10 a cup-like element having a distinct bottom wall 26 as shown in FIG. 2. Should it be desired that the bottom wall 26 be detached from the bushing structure the die-block 32 may be provided with shearing or blanking means (not shown) to coact with the mandril thereby to blank out the element 26 to leave a ring-like bushing 20.

Being that a great deal of energy is imparted or transferred to the workpiece 10 during the operation of the bushing forming apparatus 30, the workpiece 10 conforms tightly to the forming portions of the mandril 34 including the elements 48 and in this operation the helically arranged oil-groove structures 22, 24 are imparted to the bushing 20.

To retract the mandril 34 from the die-block 32 in a manner so as to strip the bushing 20 from the forming portion of the mandril it is requisite that the mandril 34 retract along a screw path so as not to destroy the oil-groove structures 22, 24. In this connection it is desirable that the bushing 20 be held immovable with respect to the die-block 32 and to this end selectively projectable detent means 80 are arranged in the bore 38, at least one to engage the recess 16 of the bushing 20.

More specifically, each detent 80 includes a pin 82 having a downwardly bevelled free end which projects into the bore 38 a distance not more than the thickness of the bushing 20. Each pin 82 is spring biased so that as the workpiece ends with the mandril 34, the pin 82 is moved by the workpiece against the bias of the spring back into the surrounding die-block to re-emerge therefrom when the edge of the workpiece passes the free end of the pin 82. Two detents 80 are provided in diametrically opposite positions so as to prevent tilting of the bushing 20 when the mandril 34 is retracted. One detent 80 supplements the holding power of the other. Thus it will be understood that the locating pin 42 and one of the projecting detents 80 are in vertical alignment whereby when the workpiece 10 is carried downwardly by the mandril 34 the recess 16 will engage the element 80.

It is to be understood that during the retraction of the mandril 34 the bushing 20 is held relatively immovable both rotatably and axially with respect to the die-block 32. At this time the cam followers 54 are advanced into the camway structures 52 to impart a rotational motion to the mandril 34 as it is retracted from the die-block 32, such rotational movement being essentially complementary to the helical oil-groove structure formed in the bearing 24 corresponding to the elements 48.

The bushing 20 may be discharged from the die-block 32 by means of gravity and permitted to fall into a hopper or the like. Thereafter a subsequent workpiece 10 may be positioned by many suitable means including by hand in the counterbore 40 for the succeeding forming operation.

It is to be understood from the above that the apparatus herein described affords efficient means for producing in a rapid manner a highly desirable form of bushing. The instant apparatus achieves superiority in initial cost and in replacement over the tooling structures heretofore employed, or attempted to be employed, in forming a helical oil-groove structure internally of a sleeve bearing.

While there has been described what is at present to be the preferred embodiment of the invention, it will be understood that various modifications may be made therein, and it is intended to cover in the appended claims all such modifications as wall within the true spirit and scope of the invention.

What is claimed is:

1. Apparatus for coining from a flat, circular workpiece, having a recess in an edge thereof, a ring-like bushing having an internal bearing surface provided with helical oil-groove structure, comprising in combination: a female die-block having through a surface thereof a throat-like opening which tapers into a cyilndrical bore generally complementary in size to the outside diameter of the desired bushing; said die-block having a counterbore surrounding said throat for concentrically receiving such workpiece therein concentrically with respect to said bore; locating means projecting in said counterbore to cooperate with such recess of the workpiece for locating same with respect to said selectively projecting means of said bore; a mandril mounted for reciprocal movement and having a forming cylindrical portion coaxially arranged with respect to said bore to be insertable therein, said forming portion being generally complementary in size to the inside diameter of the bushing and having helical structure protruding from the cylindrical surface thereof shaped complementary to the desired oil-groove structure of such bushing; means coacting with said mandril for retraction thereof from said bore with a rotational movement along a helical path corresponding in direction to such oil-groove; and detent means in said bore to engage the recess of such workpiece for restraining movement of the workpiece upon withdrawal of said mandril thereby to preserve the formation of the oil-groove structure on the bushing.

2. Apparatus for coining from a flat, circular workpiece, having a recess in an edge thereof, a ring-like bushing having an internal bearing surface provided with helical oil-groove structure, comprising in combination: a female die-block having through a surface thereof a throat-like opening which tapers into a cylindrical bore generally complementary in size to the outside diameter of the desired bushing; means on said die-block adjacent to said throat for concentrically receiving and for locating such workpiece with respect to said bore; a mandril mounted for reciprocal movement and having a forming cylindrical portion coaxially arranged with respect to said bore to be insertable therein, said forming portion being generally complementary in size to the inside diameter of the bushing and having helical structure protruding from the cylindrical surface thereof shaped complementary to the desired oil-groove structure of such bushing; means coacting with said mandril for retraction thereof from said bore with a rotational movement along a helical path corresponding in direction to such oil-groove; and detent means in said bore to engage the recess of such workpiece for restraining movement of the workpiece upon withdrawal of said mandril thereby to preserve the formation of the oil-groove structure on the bushing.

3. Apparatus for forming from a flat, circular workpiece a ring-like bushing having an internal bearing surface provided with helical oil-groove structure, comprising in combination: a female die-block having through a surface thereof a throat-like opening which tapers into a cylindrical bore generally complementary in size to the outside diameter of the desired bushing; a mandril mounted for reciprocal movements and having a cylindrical portion coaxially arranged with respect to said throat and bore to be insertable therein, said forming portion being generally complementary in size to the inside diameter of the bushing and having helical structure protruding from the cylindrical surface thereof shaped complementary to the oil-groove structure of such bushing; and means coacting with said mandril for retraction thereof from said bore in a rotational movement along a helical path corresponding in direction and shape to such helical oil-groove.

4. Apparatus for forming from a flat, circular workpiece a ring-like bushing having an internal bearing surface provided with helical oil-groove structure, comprising in combination: a female die-block having through a surface thereof a throat-like opening which tapers into a cylindrical bore generally complementary in size to the outside diameter of the desired bushing; a mandril mounted for reciprocal movements and having a cylindrical portion coaxially arranged with respect to said throat and bore to be insertable therein, said forming portion being generally complementary in size to the inside diameter of the bushing and having helical structure protruding from the cylindrical surface thereof shaped complementary to the oil-groove structure of such bushing; cam and follower means associated with said mandril, said last mentioned means being cooperable with said mandril on the retraction stroke thereof to permit withdrawal of said mandril along a screw-like path corresponding in shape to said helical protruding portions.

5. Apparatus for coining from a flat, circular workpiece, having a recess in an edge thereof, a ring-like bushing having an internal bearing surface provided with helical oil-groove structure, comprising in combination: a female die-block having through a surface thereof a throat-like opening which tapers into a cylindrical bore generally complementary in size to the outside diameter of the desired bushing; means on said die-block adjacent to said throat for concentrically receiving and for locating such workpiece with respect to said bore; a mandril mounted for reciprocal movement and having a forming cylindrical portion coaxially arranged with respect to said bore to be insertable therein, said forming portion being generally complementary in size to the inside diameter of the bushing and having helical structure protruding from the cylindrical surface thereof shaped complementary to the desired oil-groove structure of such bushing; cam and follower means associated with said mandril, said last mentioned means being cooperable with said mandril on the retraction stroke thereof to permit withdrawal of said mandril along a screw-like path corresponding in shape to said helical protruding portions; and detent means in said bore to engage the recess of such workpiece for restraining movement of the workpiece upon withdrawal of said mandril thereby to preserve the formation of the oil-groove structure on the bushing.

6. In a method of manufacturing from a flat, circular workpiece a sleeve-bushing having an internal bearing surface provided with helical oil-groove structure, the steps comprising: providing a mandril for insertion into a female die-block structure, said mandril having helically-shaped, outwardly protruding configurations on the sides thereof substantially complementary to the desired oil-groove structure; positioning the workpiece for cooperative engagement of the mandril and die-block; forcibly pressing with the mandril the workpiece into the die-block to cause the workpiece to wrap itself about the mandril including the helically-shaped protrusions; and retracting the mandril from the workpiece in a helical-rotational movement to preserve the thus formed helical oil-groove structures.

7. In a method of manufacturing from a flat, circular workpiece, a sleeve-bushing having an internal bearing surface provided with helical oil-groove structure, the steps comprising: providing a mandril for insertion into a female die-block structure, said mandril having helically-shaped, outwardly protruding configurations on the sides thereof substantially complementary to the desired oil-groove structure; positioning the workpiece for cooperative engagement of the mandril and die-block; forcibly pressing with the mandril the workpiece into the die-block to cause the workpiece to wrap itself about the mandril including the helically-shaped protrusions; restraining the workpiece with respect to the die-block; and retracting the mandril from the workpiece in a helical-rotational movement to preserve the thus formed helical oil-groove structure.

References Cited in the file of this patent
UNITED STATES PATENTS

| | | |
|---|---|---|
| 1,923,514 | Stockfieth | Aug. 22, 1933 |
| 2,177,584 | Salansky | Oct. 24, 1939 |
| 2,297,385 | Beidermann | Sept. 29, 1942 |